(12) United States Patent
Knebel et al.

(10) Patent No.: US 8,724,103 B2
(45) Date of Patent: May 13, 2014

(54) METHOD AND APPARATUS FOR IDENTIFYING AND CORRECTING SPHERICAL ABERRATIONS IN A MICROSCOPE IMAGING BEAM PATH

(71) Applicant: Leica Microsystems CMS GmbH, Wetzlar (DE)

(72) Inventors: Werner Knebel, Kronau (DE); Tobias Bauer, Koenigstein (DE); Peter Euteneuer, Lahnau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 14 days.

(21) Appl. No.: 13/650,170

(22) Filed: Oct. 12, 2012

(65) Prior Publication Data
US 2013/0094016 A1    Apr. 18, 2013

(30) Foreign Application Priority Data

Oct. 14, 2011   (DE) .......................... 10 2011 084 562

(51) Int. Cl.
*G01B 9/00*    (2006.01)
*G01N 21/41*    (2006.01)

(52) U.S. Cl.
USPC ........................... 356/124; 356/127; 356/128

(58) Field of Classification Search
USPC ................... 356/124–127, 239.1–239.8, 515
See application file for complete search history.

(56) References Cited

U.S. PATENT DOCUMENTS

| | | | |
|---|---|---|---|
| 4,595,829 A | 6/1986 | Neumann et al. | |
| 4,606,634 A * | 8/1986 | Bieringer | 356/239.4 |
| 5,350,374 A * | 9/1994 | Smith | 606/5 |
| 5,428,414 A * | 6/1995 | Iwane | 351/214 |
| 5,561,562 A | 10/1996 | Bender | |
| 5,838,419 A * | 11/1998 | Holland | 351/159.78 |
| 6,056,739 A * | 5/2000 | Klopotek | 606/5 |
| 6,621,564 B2 * | 9/2003 | Akiyama et al. | 356/124 |
| 7,593,173 B2 | 9/2009 | Harada et al. | |
| 2004/0113043 A1 | 6/2004 | Ishikawa et al. | |
| 2008/0310016 A1 | 12/2008 | Karasawa et al. | |
| 2010/0033811 A1 | 2/2010 | Westphal et al. | |
| 2011/0043905 A1 | 2/2011 | Mitzkus et al. | |

FOREIGN PATENT DOCUMENTS

| | | |
|---|---|---|
| DE | 32 19 503 A1 | 12/1983 |
| DE | 43 23 721 A1 | 1/1995 |
| DE | 10049296 A1 | 2/2002 |
| DE | 102007002863 B3 | 8/2008 |
| DE | 102008018951 A1 | 10/2009 |
| WO | WO 2007/144197 A1 | 12/2007 |

* cited by examiner

*Primary Examiner* — Gregory J Toatley
*Assistant Examiner* — Jarreas C Underwood
(74) *Attorney, Agent, or Firm* — Leydig, Voit & Mayer, Ltd.

(57) ABSTRACT

A method and apparatus provide identification of a spherical error of a microscope imaging beam path in a context of microscopic imaging of a sample using a microscope having an objective. A coverslip that carries or covers the sample is arranged in the imaging beam path. A measurement beam is guided through the objective onto the sample in a decentered fashion that is outside an optical axis of the objective. The measurement beam is reflected at an interface of the coverslip with the sample and the reflected measurement beam is guided through the objective onto a detector. An intensity profile of the reflected measurement beam is detected with the detector and a presence of a spherical error from the intensity profile is determined qualitatively and/or quantitatively.

20 Claims, 5 Drawing Sheets

METHOD AND APPARATUS FOR IDENTIFYING AND CORRECTING SPHERICAL ABERRATIONS IN A MICROSCOPE IMAGING BEAM PATH

CROSS REFERENCE TO RELATED APPLICATIONS

This application claims priority to German Patent Application No. DE 10 2011 084 562.3, filed Oct. 14, 2011, which is hereby incorporated by reference herein in its entirety.

FIELD

The present invention relates to a method and an apparatus for identifying and correcting a spherical error in the context of microscopic imaging of a sample by means of a microscope comprising an objective, a coverslip that carries the sample or covers the sample being arranged in the imaging beam path of the microscope.

BACKGROUND

For microscopic investigations, the samples to be investigated are usually placed onto or under coverslips (also: "cover glass"), or into large-area sample chambers (well plates, microtiter plates, Labtech plates). A variety of coverslip thicknesses exist; in the case of the aforesaid sample chambers in particular, the coverslip thickness can fluctuate markedly. Different coverslip thicknesses negatively affect the optical performance of the system when the coverslip is arranged in the imaging beam path. In the context of a screening using a large-area sample chamber, a fluctuation in coverslip thickness results in diminished image quality (in particular, contrast as well as resolution are negatively influenced). This aberration, also referred to as "spherical error," can be corrected by way of an additional adjustable correction lens element. This lens element is usually mounted inside the objective, the adjustment usually occurring manually via a so-called correction ring on the outer barrel of the objective. The focus that has been set is, ideally, left unchanged by the correction lens element.

DE 43 23 721 C2 deals with a microscope objective of this kind having a correction apparatus for adapting to different coverslip thicknesses; this document proposes that the correction mount having the correction lens element be both axially displaceable along the optical axis and radially rotatable around the optical axis. In particular, two such correction mounts are to be present. The proposed feature is said to make possible extremely uniform and jam-free displacement of the correction mount within the microscope objective. The objective proposed therein is said to enable correction for a coverslip thickness from 0 mm to 2 mm.

DE 10 2007 002 863 B3 likewise describes an adjustment apparatus, suitable for coverslip thickness correction, for microscope objectives, the adjustment apparatus being manually actuated. If coverslips of differing thickness are used in microscopic investigation, manual correction must be carried out again for each new coverslip thickness. This is time-consuming and makes the microscope more difficult to handle.

U.S. Pat. No. 7,593,173 B2 describes a motorized adjustment apparatus for coverslip thickness correction. This adjustment apparatus comprises a drive motor, installed on an objective turret, whose drive shaft is selectably couplable to one of several microscope objectives held on the objective turret. Each of the microscope objectives possesses a correction ring of the kind described earlier, which is to be brought into engagement with said drive shaft.

It has been found that in addition to the different coverslip thicknesses and/or coverslip thickness fluctuations addressed above, further parameters can contribute to spherical errors of the objective in the context of microscopic investigation. These parameters are, in particular, the nature and temperature of an immersion medium being used, as well as the material and structure of the coverslip. Coverslips are usually produced from float glass, which is further used in particular for LED covers. Such float glass exhibits differing flatness and homogeneity. Immersion media (immersion oil, water, or glycerol) are often introduced for various purposes between the microscope objective and coverslip, and the microscope objective is then used as an immersion objective whose front element is immersed into the immersion medium. Oil immersion objectives serve to increase the achievable resolution. Water immersion is often used for the observation of living cells or tissue, in order to prevent the prepared specimen from drying out. In general, immersion media can decrease contrast-reducing reflections due to a large change in refractive index at the interfaces. In the case of long-duration screenings of prepared specimens in particular, the temperature of the respective immersion medium changes during the investigation. This results in corresponding changes in image quality.

Aberrations resulting from the above-described effects will be defined hereinafter as "spherical errors." The known methods for coverslip thickness compensation are not sufficient to eliminate all spherical errors.

SUMMARY

In an embodiment, the present invention provides a method and apparatus for identifying a spherical error of a microscope imaging beam path in a context of microscopic imaging of a sample using a microscope having an objective. The method includes arranging a coverslip that carries or covers the sample in the imaging beam path. A measurement beam is guided through the objective onto the sample in a decentered fashion that is outside an optical axis of the objective. The measurement beam is reflected at an interface of the coverslip with the sample and the reflected measurement beam is guided through the objective onto a detector. An intensity profile of the reflected measurement beam is detected with the detector and a presence of a spherical error from the intensity profile is determined qualitatively and/or quantitatively.

BRIEF DESCRIPTION OF THE DRAWINGS

Exemplary embodiments of the present invention are depicted schematically in the drawings, and will be described in detail below with reference to the drawings, in which FIG. 1 schematically depicts an example of a conventional triangulating autofocus device.

DETAILED DESCRIPTION

Figure 1:
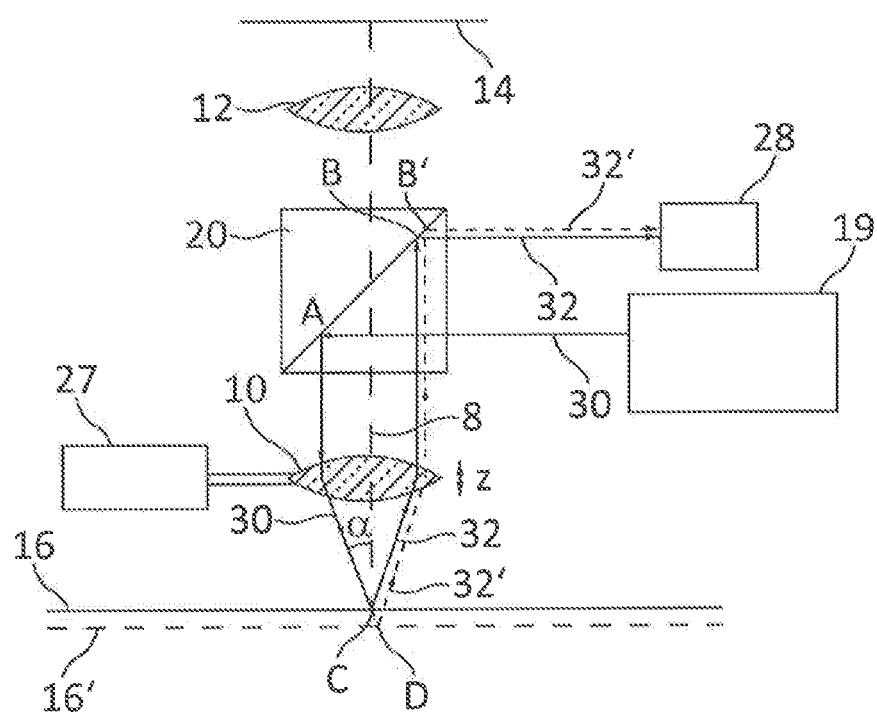

An aspect of the present invention is to enhance image quality in the context of microscopic sample investigation by very largely automatic correction of spherical errors that occur.

In an embodiment, the present invention provides a method for identifying a spherical error in the context of microscopic imaging of a sample by means of a microscope comprising an objective, a coverslip that carries or covers the sample being arranged in the imaging beam path of the microscope, a measurement beam being guided in decentered fashion, outside the optical axis of the objective, through the objective onto the sample; and the measurement beam reflected at the interface of the coverslip with the sample being guided through the objective onto a detector which acquires the intensity profile of the reflected measurement beam. The presence of a spherical error can be identified by qualitative and/or quantitative evaluation of said intensity profile.

The invention also relates to a corresponding apparatus for identifying a spherical error in the context of microscopic imaging of a sample by means of a microscope comprising an objective, a coverslip that carries or covers the sample being arranged in the imaging beam path. This apparatus comprises an incoupling device for coupling a measurement beam into the imaging beam path of the microscope in such a way that the measurement beam is incident in decentered fashion, outside the optical axis of the objective, through the objective onto the sample; an outcoupling device for coupling the measurement beam reflected at the interface of the coverslip with the sample, after passing through the objective, out of the imaging beam path of the microscope; a detector onto which the measurement beam is incident after outcoupling out of the imaging beam path, and which acquires a (wavelength-dependent) intensity profile of said measurement beam; and an evaluation unit for evaluating the intensity profile in order to identify a spherical error.

Further advantages and embodiments of the invention are evident from the respective dependent claims and from the description below, and from the appended drawings.

It has been found that the intensity profile of a measurement beam reflected in the aforesaid manner at the interface of the coverslip with the sample is sensitive to the causes, recited in the introductory part of the specification, of spherical errors. The shape of the ideal intensity profile that exists in the absence of spherical errors changes when spherical errors occur, for example because of changes in coverslip thickness, temperature fluctuations of an immersion medium, or changes in the structure of the coverslip. Specific parameters of the ideal intensity profile can consequently be used as a controlled variable in order to compensate for deviations, i.e. the occurrence of spherical errors, when they occur. This compensation can thus occur in real time, i.e. (almost) without lag. A further advantage is that the coverslip thickness, or changes in the coverslip thickness, need not be known or determined in order to allow the correction of spherical errors that occur. The invention can be used to compensate for spherical errors regardless of the reason why the spherical errors are occurring.

The shape of the intensity profile can be evaluated in terms of a variety of parameters. It is principally the variables that describe the signal width, signal height, or edge slope that are particularly useful. For example, the full width at half maximum of the profile can be determined. This width increases when a spherical error is present. Alternatively or additionally, the edge steepness of the intensity profile can be determined. In simple form this can be done, for example, by calculating a difference quotient. The edge steepness decreases with the spherical error. The signal height can be ascertained in simple fashion by determining the maximum value. Model-based methods for evaluating the signal, which are based on an adaptation of the intensity profile to a function describing the profile, turn out to be more demanding in terms of technical implementation, but numerically more stable. It is possible, for example, to approximate the entire signal or parts of the signal (the edges) by means of a Gaussian function, and to obtain directly, from the values thereby ascertained, parameters for width or edge slope. Local adaptations to other functions, for example polynomials of various orders, also enable evaluations of width and slope.

The invention can be particularly sensitive, and thus usable in practice, when a spherical error occurs due to a change in the optical properties of the cover slip and/or a change in the optical properties of an immersion medium. As already discussed, this encompasses changes and fluctuations in coverslip thickness, changes in the structure or material of the coverslip, and changes in the temperature of the immersion medium.

The measurement beam used to identify a spherical error can be generated in simple fashion, for example, by illuminating a slit aperture or pinhole having a downstream illumination optic, so that an image of the slit aperture or pinhole is generated on the sample (more precisely on the interface of the coverslip with the sample) by means of the microscope objective.

In a particularly advantageous embodiment of the invention, the measurement beam for identifying a spherical error can additionally be used as an autofocus measurement beam of a triangulating autofocus unit. Conversely, when a triangulating autofocus unit for setting and/or holding the focus of the objective is present, the autofocus measurement beam of said autofocus unit can additionally be used as a measurement beam for identifying a spherical error.

A triangulating autofocus device is described in, for example, U.S. Pat. No. 5,136,149 B1. DE 195 37 376 A1 discusses this US patent document and refers to the autofocus principle described therein as a "triangulating" autofocus principle. This will be further explained with reference to the appended FIG. 1, which corresponds to the triangulating autofocus principle from the aforementioned U.S. Pat. No. 5,136,149 B1. Here an autofocus light source 19 is arranged so that after deflection of the autofocus measurement beam 30 and passage thereof through microscope objective 10, object plane 16 is struck obliquely by autofocus measurement beam 30. The autofocus scanning unit contains a spatially resolving autofocus detector 28 for detecting a lateral offset of the beam (as described below), as well as a motor 27 for moving objective 10. Alternatively, object plane 16 can also be displaced in the direction of optical axis 8 (i.e. in the Z direction, as depicted in FIG. 1) for focusing.

Further components of the microscope depicted only very schematically in FIG. 1 are a tube lens 12 and image plane 14. With the autofocus device according to FIG. 1, the autofocus measurement beam (labeled 30) is deflected by beam splitter 20 at a point A into one half of the beam cross section (with reference to optical axis 8). The deflected beam 30 is deflected by objective 10 so as to strike object plane 16, at a reflection point C, in skewed or oblique fashion at an angle α. Beam 30 is reflected or remitted as a reflected autofocus measurement beam 32, and is then once again deflected via objective 10 by beam splitter 20 at a point B on the other side of the beam path, with reference to the location of point A relative to optical axis 8. The deflected beam 32 is then incident onto detector 28, for example a position-sensitive detector (PSD).

The output signal thereof depends on the location at which beam 32 arrives, so that the position is thereby determined.

In the event of a defocus condition, i.e. in the present example according to FIG. 1 a displacement of object plane 16 into plane 16', autofocus measurement beam 30 is not reflected until reflection point D, which is displaced with respect to point C not only in the direction of optical axis 8, but also laterally with respect thereto. As is evident, the corresponding reflected beam 3T reaches detector 28 at a different location, and thus supplies a modified signal as compared with the focus position. The degree of defocusing can thereby be measured. By way of a corresponding regulation or control unit, the defocus condition can be compensated for by corresponding application of control to motor 27, which moves the objective lens in the Z direction (i.e. in the direction of optical axis 8).

A similar autofocusing apparatus for incident-light microscopes, which operates according to the triangulation principle described above, is described in DE 32 19 503 A1. US 2004/0113043 A1 describes a similar autofocus system that uses a half-blocked measurement beam to generate a measurement slit by means of infrared light onto an object to be microscopically investigated, and utilizes a CCD array sensor as a detector. The correlation between the corresponding detected signal and the actual focus position is depicted graphically in this US document. WO 2007/144 197 A1 also deals with autofocusing by means of triangulation methods. DE 10 2008 018 951 A1 deals with a microscope based thereon, having a focus-hold unit.

Embodiments of the invention can thus be implemented in particularly advantageous fashion in microscopes that already possess a triangulating autofocus device. Evaluation of the autofocus measurement beam is expanded in such a way that not only its position, but also its intensity profile is measured and analyzed. A parameter ascertained from the intensity profile can then be used to annul a spherical error that occurs.

The invention is also particularly suitable for subsequent correction of the spherical error that has been identified. There are essentially two methods available for this:

On the one hand, compensation for the spherical error can occur by means of a correction lens element, already described above, that is present in the objective. It is advantageous to apply control to this correction lens element in motorized fashion, and to make the control application signals available via a control loop that eliminates a deviation from an ideal intensity profile (target value) upon the occurrence of spherical errors. One of the aforementioned parameters of the intensity profile, for example the edge steepness, then serves as an input variable of the control loop. The correction lens element is adjusted in suitable fashion until the edge steepness assumes the value exhibited by the edge steepness of the ideal intensity profile.

On the other hand, compensation for the spherical error can occur by using an adaptive optic, which is arranged in a plane conjugated with the objective pupil and is controlled in order to compensate for the spherical error. In this case the correction is therefore performed outside the objective.

The apparatus according to an embodiment of the present invention comprises an incoupling device for coupling the measurement beam into the imaging beam path of the microscope in such a way that the measurement beam is incident onto the sample, through the objective, in decentered fashion outside the optical axis of the objective. An outcoupling device is provided for coupling out the measurement beam, reflected at the interface of the coverslip with the sample, after passing through the objective. The incoupling device and outcoupling device advantageously encompass one common dichroic beam splitter. The dichroic beam splitter is designed in such a way that it is reflective for the wavelength of the measurement beam used (e.g. in the infrared), while it is transparent to the spectrum of the remaining light reflected or emitted by the sample. The incoupling device and outcoupling device encompass further optical elements to the extent necessary, such as lenses or beam deflectors (mirrors). The common dichroic beam splitter is advantageously arranged between the microscope tube and microscope objective in the imaging beam path of the microscope. By means of the outcoupling device, the measurement beam reflected from said interface is guided, after passing through the objective, onto a detector or imaged thereonto, said detector being equipped with a detector surface to allow an intensity profile of the measurement beam to be acquired. Such detectors are sufficiently known, for example, in the form of CCD cameras. An evaluation unit, integrated into the detector or alternatively separate from the detector, is designed to evaluate the intensity profile of the measurement beam acquired by the detector.

In the absence of spherical errors, the intensity profile possesses an "original shape," i.e. maximum edge steepness, minimum possible full width at half maximum, and maximum intensity signal level, as compared with profiles that have been acquired in the presence of spherical errors. The evaluation unit is designed to determine a parameter of the intensity profile. Possible parameters are one or more of the parameters already mentioned, such as full width at half maximum, edge steepness, and maximum intensity value.

In accordance with the first embodiment, already addressed above, for compensating for an identified spherical error, a correction lens element for compensating for a spherical error is present in the objective of the microscope, a control application unit being provided in order to adjust the correction lens element. Such correction lens elements having a corresponding control application unit are known per se for coverslip thickness correction.

A regulation unit, which is in communication with the evaluation unit in order to deliver a signal that represents a parameter of the intensity profile, is provided in order to implement automatic regulation in order to compensate for an identified spherical error, the regulation unit being in turn in communication with the aforesaid control application unit of the correction element of the objective in order to deliver a regulation signal so as to perform an adjustment of the correction element until an identified spherical error is compensated for.

The evaluation unit generates for this purpose, for example, a signal that represents the edge steepness of the intensity profile. If, in the presence of a spherical error, this edge steepness (actual value) deviates from the optimum value of the edge steepness (target value), the regulation device then generates, as a function of that deviation, a regulation signal or adjustment signal for the control application unit in order to adjust the correction element of the microscope objective. This adjustment is performed by the regulation device until the deviation between the actual value and target value is equal to zero, i.e. the identified spherical error has been compensated for.

According to a further embodiment, addressed above, for compensating for an identified spherical error, an adaptive optic is arranged in the beam path in order to compensate for the spherical error. The adaptive optic used can be, for example, a deformable mirror whose upper mirror side can be continuously deformed by means of actuators arranged on its rear side. Control is applied to the actuators by way of a corresponding control application unit. Such deformable mirrors are known, and will not be described further. The deformable mirror is preferably arranged in the objective pupil. Because of the inaccessibility of the objective pupil itself, this must occur in a plane conjugated with it and outside the objective; this can be realized using a transport optic or so-called relay optical system. Because the spherical error is corrected outside the objective, the autofocus superimposition location must also be displaced behind the conjugated plane of the objective pupil. The arrangement of the dichroic beam splitter, and the construction of the autofocus system, are not influenced by these actions.

Once again, an identified spherical error can be automatically compensated for by means of a control loop if a regulation device is provided which is in communication with the evaluation unit in order to deliver a signal which represents a parameter of the intensity profile, and is in communication with the control application unit of the adaptive optic in order to deliver a control signal or adjustment signal so as to apply control to the adaptive optic until an identified spherical error is compensated for.

With regard to details of this regulation system, reference is made to the statements regarding the regulation device that applies control to the control application unit of the correction lens element of the objective. It should also be emphasized that in principle, the two embodiments discussed for compensating for an identified spherical error are not mutually exclusive; i.e. both a correction lens element and an adaptive optic can be provided. The corresponding regulation devices can be provided separately from one another, or also combined into one common regulation device.

In a particularly advantageous embodiment already discussed above, the evaluation unit is designed not only to evaluate the intensity profile but also to determine the spatial position of the intensity profile and any change in that spatial position on a detector surface of the detector.

The evaluation unit is furthermore designed in particular to generate, upon a change in the position of the intensity profile, an autofocus parameter of a defocus condition that is present. As already stated earlier, a lateral position displacement is correlated with a defocus condition in accordance with a triangulating autofocus principle. A correspondingly designed evaluation unit ("combined evaluation unit") is thus suitable not only for identifying a spherical error, but also for identifying a defocus condition.

In order to annul a defocus condition, i.e. to set or hold a focus, it is advantageous if an autofocus control application unit is additionally provided in order to set the focus of the microscope, for example by corresponding movement of lens elements in the objective or of the entire objective or of the object plane; in addition, an autofocus regulation device should be provided which is in communication with the evaluation unit in order to deliver a signal that represents an autofocus parameter, and which is in communication with the autofocus control application unit in order to deliver a further signal, so as to perform a focus adjustment until a defocus condition that is present is annulled.

The aforementioned regulation device for compensating for a spherical error can of course constitute one common unit with the autofocus regulation device being discussed here. Similarly, the control application unit for applying control to a correction element in the objective, or to an adaptive optic, in order to compensate for a spherical error can constitute one common unit with the autofocus control application unit discussed here for setting the focus of the microscope. Lastly, the evaluation unit for generating a parameter of the intensity profile (and optionally for generating an autofocus parameter) can constitute one unit with the detector for acquiring the intensity profile (and optionally for positional determination of the intensity profile).

It is understood that the features recited above and those yet to be explained below are usable not only in the respective combination indicated, but also in other combinations or in isolation, without departing from the scope of the present invention. In particular, the invention is not limited to a specific microscopy method. In other words, it can be used both with wide-field microscopy (so-called "classic" microscopy with imaging of a field of view on the object) and with scanning microscopy, which scans an object with an imaging beam and assembles the image from the individual image points. With the known methods for scanning microscopy (confocal, multi-photon, second harmonic, third harmonic, and coherent anti-Stokes Raman scattering [CARS]), the power level of the light coming from the object is thus measured as a function of the position of the scanning beam; this can be carried out using the spatially resolving detector that is in any case necessary.

FIG. 1, which shows a triangulating autofocus device according to the existing art U.S. Pat. No. 5,136,149 B1, has already been thoroughly described in the Specification in conjunction with a particularly advantageous embodiment of the invention.

Figure 2:
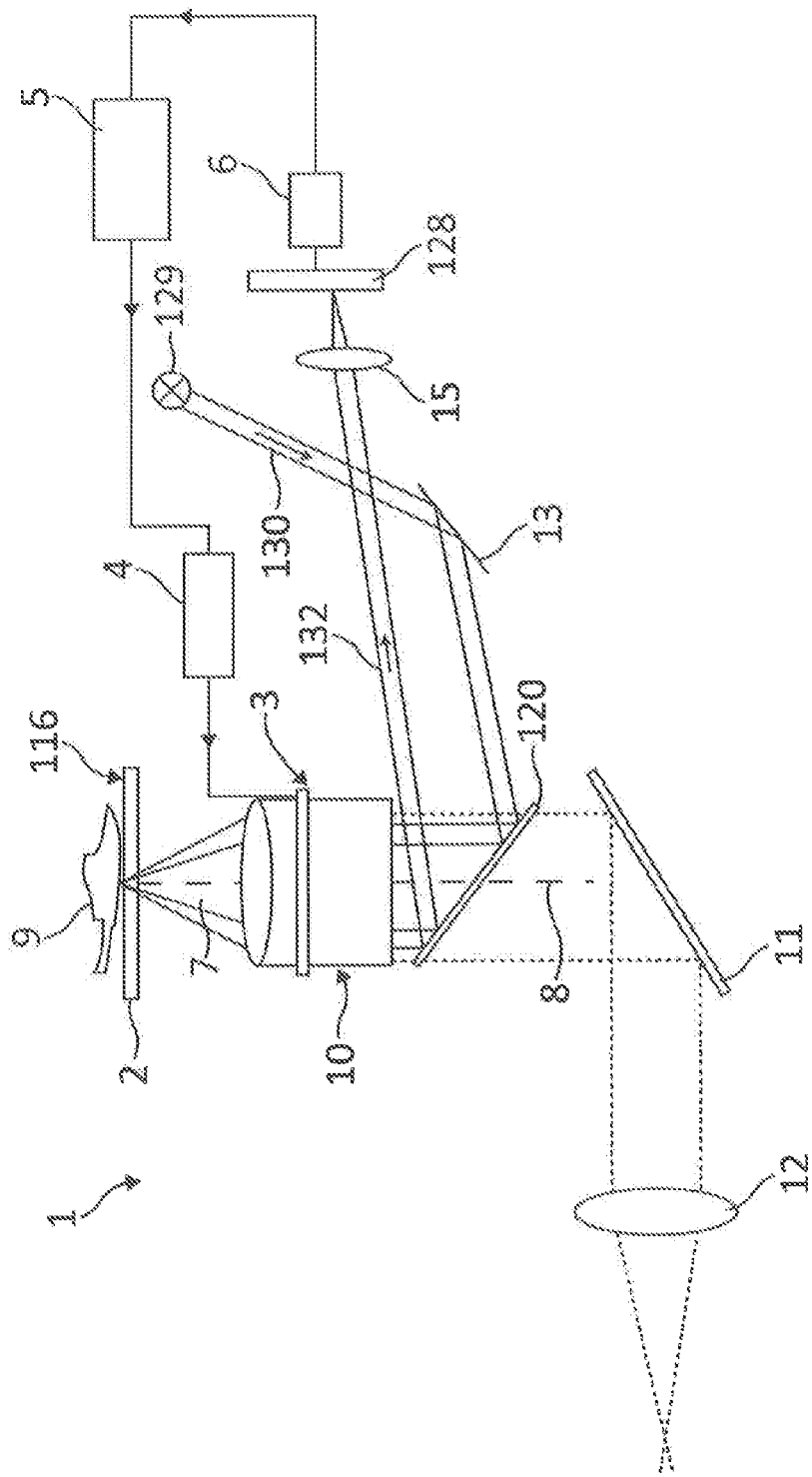
FIG. 2 schematically shows an embodiment of an apparatus for identifying a spherical error in the context of microscopic imaging, according to the invention.

FIG. 2 schematically shows a preferred embodiment of an apparatus according to an embodiment of the present invention for identifying a spherical error in the context of microscopic imaging by means of a microscope 1, only some components (described below) of which are shown. A sample 9 is located on a coverslip 2 carrying sample 9. This coverslip 2 is located in imaging beam path 7 of microscope 1. The microscope objective is labeled 10. A tube lens 12 is depicted merely schematically. Further details, such as an eyepiece, image acquisition detector, zoom system, etc. are not depicted here because they are not essential to understanding the present invention. Such units are known to the skilled artisan from the existing art.

Sample 9 can involve living cells that are being observed over a longer period of time. Scanning of sample 9 along an X-Y direction, i.e. in a plane perpendicular to the drawing plan of FIG. 2, is also possible. With such typical microscopic investigations, it may happen that the thickness of coverslip 2 varies depending on the sample location being investigated; in addition, the material structure of coverslip 2 may be inhomogeneous over the course of the X-Y plane. When an immersion objective (not depicted here) is used, an immersion medium is present between coverslip 2 and objective 10; temperature fluctuations may occur in the immersion medium during the microscopic investigation. All the aforesaid changes represent changes in the optical properties of the coverslip or immersion medium, and have a disadvantageous effect ("spherical errors") on optical image quality.

For the detection and identification of a spherical error, a measurement beam 130 proceeding from a measurement light source 129 is guided in decentered fashion, i.e. outside optical axis 8 of objective 10, through objective 10 onto sample 9. Measurement beam 132 reflected at interface 116 of coverslip 2 with sample 9 is in turn guided via objective 10 onto a detector 128. Measurement beam 130 is generated for this purpose, for example, by a slit aperture having a downstream illumination optic. An image of the slit is produced on said interface 116. The incoupling of measurement beam 130 into the beam path of microscope 1 is performed via an incoupling device that in this case encompasses substantially a deflection element 13 as well as a dichroic beam splitter 120. On the other hand, outcoupling of reflected measurement beam 132 is performed via an outcoupling device that substantially encompasses once again the aforesaid dichroic beam splitter 120 and a schematically depicted lens 15. Lens 15 in turn images a slit image onto a sensitive detector surface of detector 128. Detector 128 acquires an intensity profile of said measurement beam, which is evaluated by a downstream evaluation unit 6.

It is advantageous to select the wavelength of measurement beam 130 outside that spectral region in which sample 9 is being microscopically viewed. A wavelength from the infrared region is, for example, useful for measurement beam 130. Whereas dichroic beam splitter 120 is reflective for the wavelength region of measurement beam 130 and of reflected measurement beam 132, it is transparent to the remainder of the spectrum, but in particular to the spectrum at which sample 9 is being microscopically investigated. The observation beam path transmitted in this fashion is deflected at deflection element 11 toward tube lens 12.

Figure 4:
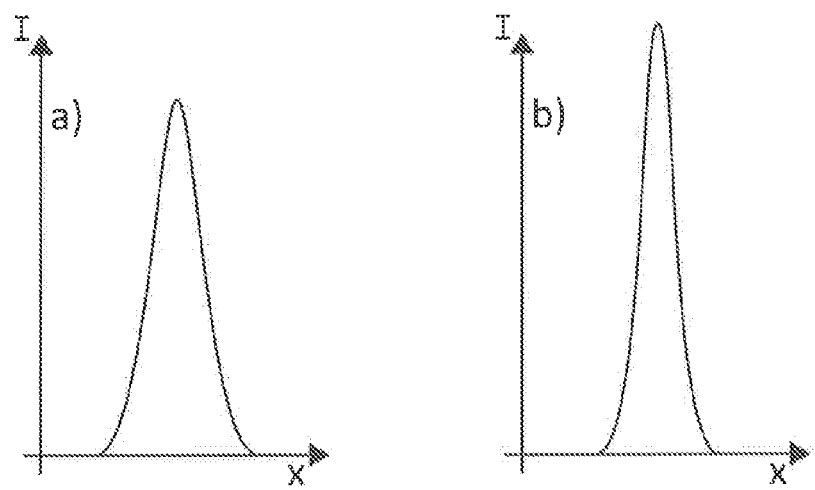
FIG. 4 shows a typical intensity profile when a spherical error is present (FIG. 4a) and when a spherical error is not present (FIG. 4b)

Typical intensity profiles of reflected measurement beam 132 acquired by detector 128 are depicted in FIG. 4. FIG. 4a shows an intensity profile (intensity I plotted against an X direction of the detector) for the case in which a spherical error is present, while FIG. 4b depicts the optimum case of an intensity profile with no spherical error. FIG. 4b consequently shows the target value of an intensity profile, while FIG. 4a shows a possible actual value of an intensity profile.

Returning to FIG. 2, evaluation unit 2 evaluates the actual value of an intensity profile (see FIG. 4a) and, in the event of a deviation from the target value of the intensity profile (optimum case according to FIG. 4b), identifies a spherical error. This spherical error can have the causes already described above. For quantitative evaluation of the spherical error that is present, the signal shape of the intensity profile is quantitatively and/or qualitatively evaluated. For this, evaluation unit 6 determines a parameter of the intensity profile, in particular a full width at half maximum, an edge steepness, and/or a signal maximum of the acquired intensity profile. The "edge steepness" refers to the slope of the intensity signal at a specific point on the profile, e.g. in regions of the full width at half maximum or at a definable signal value, e.g. the slope at 30 percent of the maximum value of the detected intensity. It is useful, for example, to use the one-sided edge slope of the intensity profile, a corresponding output signal being sent as a regulation signal from evaluation unit 6 to regulation device 5.

In regulation device 5, for example, the one-sided edge slope of the optimal or "original" intensity profile is then stored as a target value (for example, the target value according to FIG. 4b). As a function of the deviation of the actual value from the target value of the one-sided edge slope, regulation device 5 delivers a setting signal to control application unit 4 for a correction lens element 3 in objective 10, which element is provided as a displaceable lens element for coverslip thickness correction. Control application unit 4 performs a corresponding motorized adjustment of correction lens element 3. As a result, the spherical error is corrected while the focus of objective 10 remains unchanged. Be it noted that an advantage of this embodiment of the present invention is that spherical errors having any cause are corrected. In particular, a coverslip thickness correction is even possible with no need for quantitative sensing of fluctuations or changes in the coverslip thickness. Once control has been applied to correction lens element 3, the new actual value of the intensity profile is sensed and evaluated in the form of a control loop. In the event of deviations from the target value, a further application of control to correction lens element 3 occurs until the spherical error has been compensated for.

Figure 3:
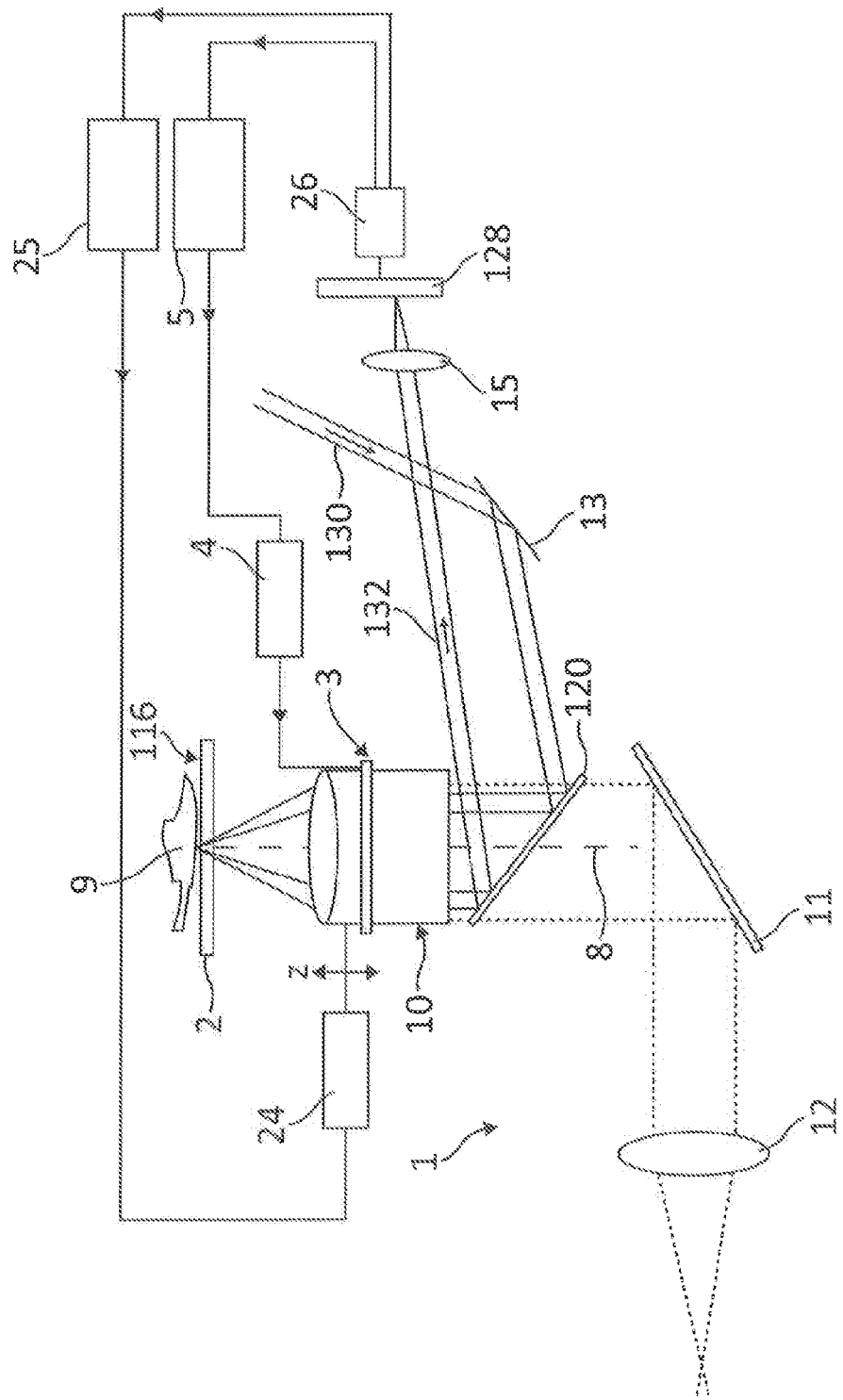
FIG. 3 schematically shows the apparatus according to FIG. 2, supplemented with a triangulating autofocus device.

FIG. 3 schematically shows an apparatus according to FIG. 2 supplemented with a triangulating autofocus device. Identical components are labeled with the same reference characters. To avoid redundancy, the apparatus according to FIG. 2 will not be discussed again; reference is made in that regard to the explanations of FIG. 2.

The apparatus according to FIG. 2 for identifying and compensating for a spherical error can ideally also be used as a triangulating autofocus device. Conversely, when a triangulating autofocus device is present, it is also possible to use it as an apparatus according to FIG. 2 for identifying and eliminating a spherical error.

In this case measurement beam 130 serves simultaneously as an autofocus measurement beam 30, as depicted in FIG. 1. Dichroic beam splitter 120 corresponds to beam splitter 20 of FIG. 1. Interface 116 of coverslip 2 with sample 9 corresponds to object plane 16 of FIG. 1. Detector 128, which according to FIG. 2 is designed to acquire an intensity profile of reflected measurement beam 132, is in the case of FIG. 3 additionally a spatially resolving detector. A spatially resolving detector of this kind detects both the intensity of the light and the position of the measurement beam. CCD linear cameras or CCD matrix cameras can be used for this, for example. Downstream from detector 128 is a combined evaluation unit 26 that determines both the intensity profile acquired by the detector in order to identify a spherical error, and the spatial position of the intensity profile. Two signals that represent corresponding parameters can thus be generated by this combined evaluation unit 26, namely a parameter of the intensity profile and a parameter of a defocus condition. The corresponding signals are guided into a regulation device 5 (see FIG. 2) and into an autofocus regulation device 25. It is thereby possible, as already stated in conjunction with FIG. 2, to compensate for a spherical error. In addition, a defocus condition occurring during microscopic investigation can be annulled via the autofocus regulation device. For this, autofocus regulation device 25 delivers to autofocus control application unit 24 a positioning signal that depends on the parameter of the defocus condition. This autofocus control application unit 24 can, for example, already be motor 27 depicted in FIG. 1, or can in turn apply control to such a motor. In the exemplifying embodiment depicted according to FIG. 3, autofocus control application unit 24 produces a displacement of objective 10 in the Z direction (i.e. parallel to optical axis 8) in order to counteract a defocus condition. Automatic focusing in the manner of a control loop can consequently be performed.

Regulation devices 5 and 25 depicted in FIG. 3 can of course be combined into one common regulation device. Conversely, the combined evaluation unit 26 depicted in FIG. 3 can be made up of two separate evaluation units.

Figure 5:
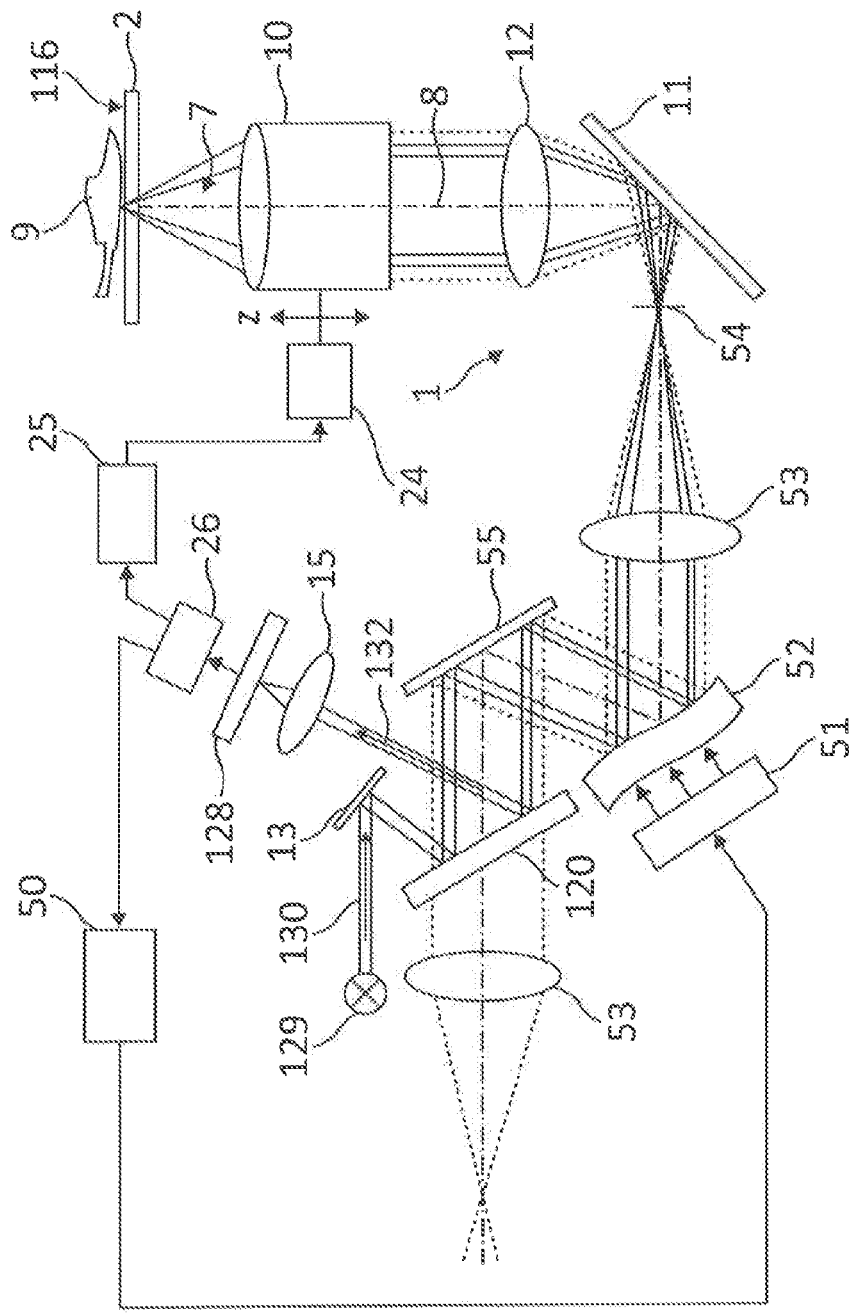
FIG. 5 schematically shows an apparatus according to FIG. 3 having a triangulating autofocus device and additionally an adaptive optic for compensating for the spherical error.

FIG. 5 schematically shows an apparatus according to FIG. 3 which, in order to compensate for the spherical error of the imaging beam path, comprises an adaptive optic 52 having an associated control application unit 51, and which is moreover equipped with a triangulating autofocus device. Identical components are labeled with the same reference characters. To avoid redundancy, the apparatus according to FIG. 3 will not be discussed again; reference is made in that regard to the explanations of FIG. 3.

In this exemplifying embodiment, measurement beam 130 for determining the spherical error serves simultaneously as autofocus measurement beam 30 as depicted in FIG. 1. The dichroic beam splitter 120 corresponds to beam splitter 20 of FIG. 1. Interface 116 of coverslip 2 with sample 9 corresponds to object plane 16 of FIG. 1. Detector 128, which according to FIG. 2 is designed to acquire an intensity profile of reflected measurement beam 132, is in the case of FIG. 5 additionally a spatially resolving detector. A spatially resolving detector of this kind detects both the intensity of the light and the position of the measurement beam. CCD linear cameras or CCD matrix cameras can be used for this, for example.

The adaptive optic used here is a deformable mirror 52 whose upper mirror side can be continuously deformed by means of actuators arranged correspondingly on its rear side. Control is applied to the actuators (not depicted) via a corresponding control application unit 51. Deformable mirror 52 is arranged in a plane conjugated with the objective pupil. A relay optical system 53 (also called a transport optic) is provided for this purpose. The corresponding intermediate image is labeled 54. The number 55 refers to an additional deflection element. The number 120 again refers to the dichroic beam splitter (see FIG. 2).

Located downstream from detector 128 is a combined evaluation unit 26 that not only evaluates the intensity profile acquired by the detector in order to identify a spherical error, but also determines the spatial position of the intensity profile. Two signals that represent corresponding parameters can thus be generated by this combined evaluation unit 26, namely a parameter of the intensity profile and a parameter of a defocus condition. The corresponding signals are guided into a regulation device 50 (see FIG. 2) and into an autofocus regulation device 25.

For evaluation of the spherical error that is present, the signal shape of the intensity profile is quantitatively and/or qualitatively evaluated. For this, evaluation unit 26 determines a parameter of the intensity profile, in particular a full width at half maximum, an edge steepness, and/or a signal maximum of the acquired intensity profile. The "edge steepness" refers to the slope of the intensity signal at a specific point on the profile, e.g. in regions of the full width at half maximum or at a definable signal value, e.g. the slope at a specific percentage of the maximum value of the detected intensity. It is useful, for example, to use the one-sided edge slope of the intensity profile, a corresponding output signal being sent as a regulation signal from evaluation unit 26 to regulation device 50.

In regulation device 50, for example, the one-sided edge slope of the optimal intensity profile is then stored as a target value (for example, the target value according to FIG. 4b). As a function of the deviation of the actual value from the target value of the one-sided edge slope, regulation device 50 delivers a setting signal to control application unit 51, which is provided for controlled deformation of the reflective surface of adaptive optic 52. Control application unit 51 performs a corresponding motorized adjustment or deformation of adaptive optic 52. As a result, the spherical error is corrected while the focus of objective 10 remains unchanged. An advantage of the present invention which emerges here is that with the embodiment discussed here, spherical errors having any cause are corrected.

Once adaptive optic 52 has been adjusted, the new actual value of the intensity profile is continuously sensed and evaluated in the form of a control loop. In the event of deviations from the target value, a further application of control to control application unit 51 occurs, which deforms the reflective surface of adaptive optic 52 in controlled fashion until the spherical error has again been compensated for. A spherical error can be continuously compensated for in this manner.

In addition, by way of the autofocus regulation device a defocus condition occurring during microscopic investigation can be compensated for, and the focus can be held consistently constant. For this, autofocus regulation device 25 delivers to autofocus control application unit 24 a positioning signal as a function of the defocus parameter. This autofocus control application unit 24 can, for example, already be motor 27 depicted in FIG. 1, or can in turn apply control to such a motor. In the exemplifying embodiment depicted according to FIG. 3, autofocus control application unit 24 produces a displacement of objective 10 in the Z direction (i.e. parallel to optical axis 8) in order to counteract a defocus condition. Automatic focusing in the manner of a control loop can consequently be performed.

The apparatus depicted in FIG. 5 is outstandingly suitable for maintaining optimum image quality during long-duration microscopic investigations.

While the invention has been particularly shown and described with reference to preferred embodiments thereof, it will be understood by those skilled in the art that various changes in form and details may be made therein without departing from the spirit and scope of the invention.

PARTS LIST

1 Microscope
2 Coverslip
3 Correction lens element
4 Control application unit for 3
5 Regulation device
6 Evaluation unit
8 Optical axis
7 Imaging beam path
9 Sample
10 Objective
11 Deflection element
12 Tube lens
13 Deflection element
14 Image plane
15 Lens
16, 16' Object plane
19 Autofocus light source
20 Beam splitter, dichroite
24 Autofocus control application unit
25 Autofocus regulation device
26 Combined evaluation unit
27 Motor
28 Autofocus detector
30 Autofocus measurement beam
32, 32' Remitted autofocus measurement beam
50 Regulation device
51 Control application unit for 52
52 Deformable mirror, adaptive optic
53 Relay optical system
54 Intermediate image
55 Deflection element
116 Interface
120 Beam splitter (dichroite)
128 Detector
129 Measurement light source
130 Measurement beam
132 Reflected measurement beam
α Angle
Z Direction
C Reflection point
D Reflection point
A Deflection point
B,B' if Deflection point

The invention claimed is:

1. A method for identifying a spherical error of a microscope imaging beam path in a context of microscopic imaging of a sample using a microscope having an objective, the method comprising:
   arranging a coverslip that carries or covers the sample in the imaging beam path;
   guiding a measurement beam through the objective onto the sample in a decentered fashion that is outside an optical axis of the objective;
   reflecting the measurement beam at an interface of the coverslip with the sample;
   guiding the reflected measurement beam through the objective onto a detector;
   acquiring an intensity profile of the reflected measurement beam with the detector; and
   determining, at least one of qualitatively or quantitatively, a presence of a spherical error from the intensity profile.

2. The method recited in claim 1, wherein the determining includes evaluating the intensity profile in terms of the signal shape.

3. The method recited in claim 1, wherein the determining includes evaluating the intensity profile so as to determine at least one of a full width at half maximum of the intensity profile, an edge steepness of the intensity profile or a maximum of the intensity profile.

4. The method recited in claim 1, wherein spherical errors due to a change in at least one of optical properties of the coverslip and optical properties of an immersion medium are identified.

5. The method recited in claim 4, wherein the change in at least one of optical properties of the coverslip include at least one of coverslip thickness or a change in the structure or material of the coverslip.

6. The method recited in claim 4, wherein the change in the optical properties of the immersion medium includes a change in temperature.

7. The method recited in claim 1, further comprising using the measurement beam as an autofocus measurement beam of a triangulating autofocus unit that is associated with the microscope.

8. The method recited in claim 1, further comprising at least one of setting or holding a focus of the objective using a triangulating autofocus unit, wherein an autofocus measurement beam of the triangulating autofocus unit is additionally used as a measurement beam for identifying a spherical error.

9. The method recited in claim 1, further comprising displacing a correction lens element that is present in the objective along the optical axis so as to compensate for the identified spherical error.

10. The method recited in claim 1, further comprising controlling an adaptive optic arranged in a plane conjugated with the objective pupil so as to compensate for the identified spherical error.

11. An apparatus for identifying a spherical error of a microscope imaging beam path, in a context of microscopic imaging of a sample, using a microscope with an objective and having a coverslip that carries or covers the sample being disposed in the imaging beam path, the apparatus comprising:
   an incoupling device configured to couple a measurement beam into the microscope imaging beam path of the microscope such that the measurement beam is incident in decentered fashion, outside an optical axis of the objective, through the objective onto the sample;
   an outcoupling device configured to couple the measurement beam reflected at an interface of the coverslip with the sample, after passing through the objective, out of the microscope imaging beam path of the microscope;
   a detector configured to acquire an intensity profile of the outcoupled measurement beam, the outcoupled measurement beam being imaged on the detector; and
   an evaluation unit configured to determine, at least one of qualitatively or quantitatively, a spherical error from the intensity profile.

12. The apparatus recited in claim 11, wherein the incoupling device and the outcoupling device include a beam splitter.

13. The apparatus recited in claim 11, wherein the evaluation unit is configured to determine a parameter of the intensity profile.

14. The apparatus recited in claim 13, wherein the evaluation unit is configured to determine at least one of a full width at half maximum of the intensity profile, an edge steepness of the intensity profile or a signal level.

15. The apparatus recited in claim 11, wherein the objective includes a correction lens element configured to compensate for a spherical error, and the apparatus further comprising a control application unit configured to adjust the correction lens element.

16. The apparatus recited in claim 15, further comprising a regulation device configured to receive an output signal of the evaluation, the output signal of the evaluation unit representing a parameter of the intensity profile, and the regulation device being configured to output a regulation signal to the control application unit of the correction lens element of the objective so as to perform an adjustment of the correction lens element until an identified spherical error is compensated for.

17. The apparatus recited in claim 11, further comprising an adaptive optic disposed in a plane conjugated with the objective pupil so as to compensate for a spherical error, and a control application unit configured to apply control to the adaptive optic.

18. The apparatus recited in claim 17, wherein further comprising a regulation device configured to receive an output signal of the evaluation unit, said output signal representing a parameter of the intensity profile, and to output a regulation signal to the control application unit of the adaptive optic so as to perform an application of control to the adaptive optic until an identified spherical error is compensated for.

19. The apparatus recited in claim 11, wherein the evaluation unit is configured to determine a spatial position, and change therein, of the intensity profile on a detector surface of the detector.

20. The apparatus recited in claim 19, wherein the evaluation unit is configured to generate an autofocus parameter of an existing defocus condition, upon a change in the position of the intensity profile, a regulation signal with which the focus position is modifiable until an existing defocus condition is annulled being derivable therefrom.

* * * * *